Nov. 18, 1969   H. S. RUEKBERG   3,478,387
APPARATUS FOR ELECTROSTATIC MOLDING
Filed Oct. 21, 1965   3 Sheets-Sheet 2
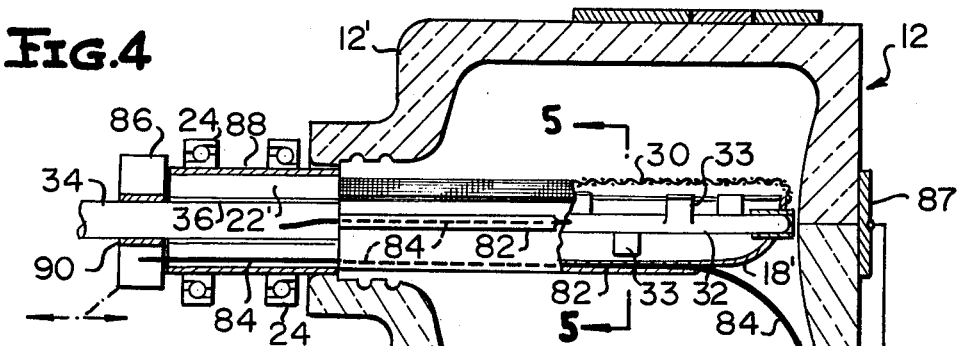
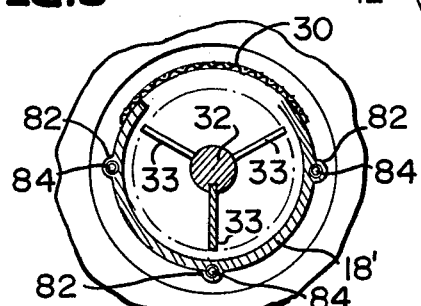
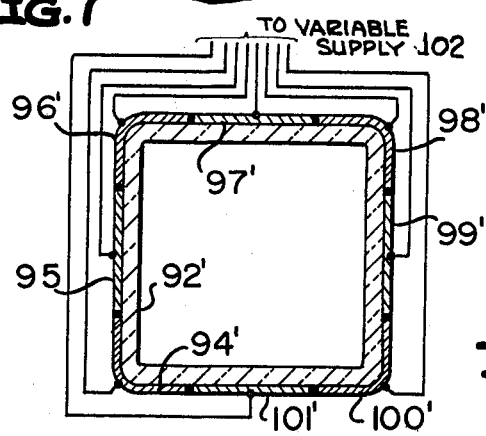
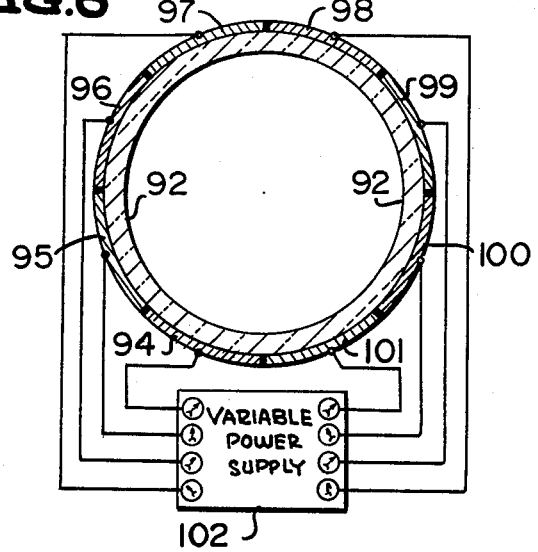
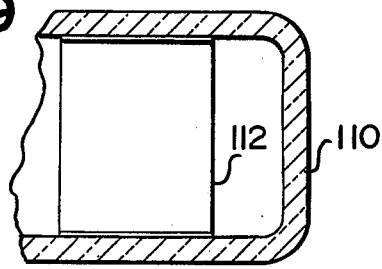
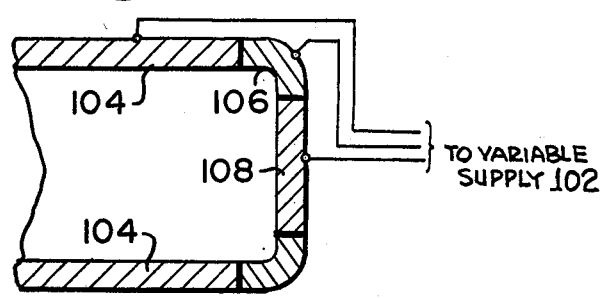
INVENTOR
HERBERT S. RUEKBERG
BY
ATTORNEYS Nov. 18, 1969    H. S. RUEKBERG    3,478,387
APPARATUS FOR ELECTROSTATIC MOLDING
Filed Oct. 21, 1965    3 Sheets-Sheet 3
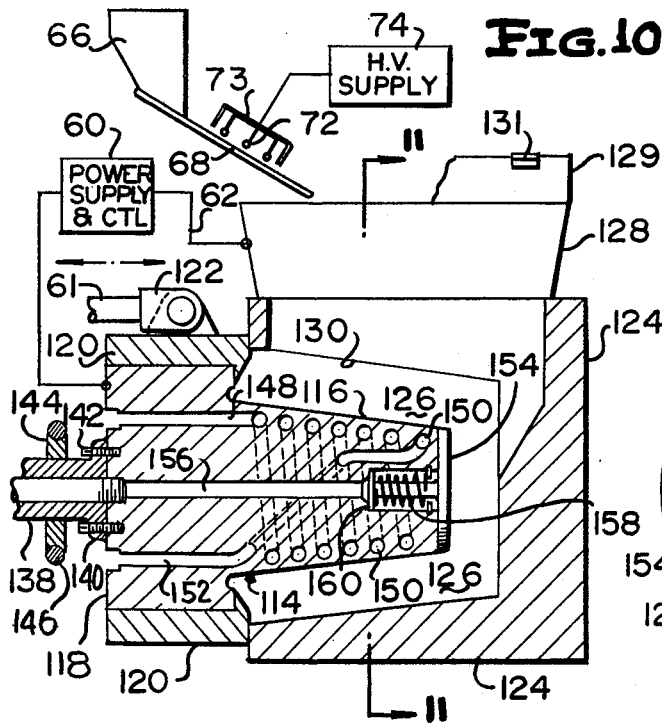

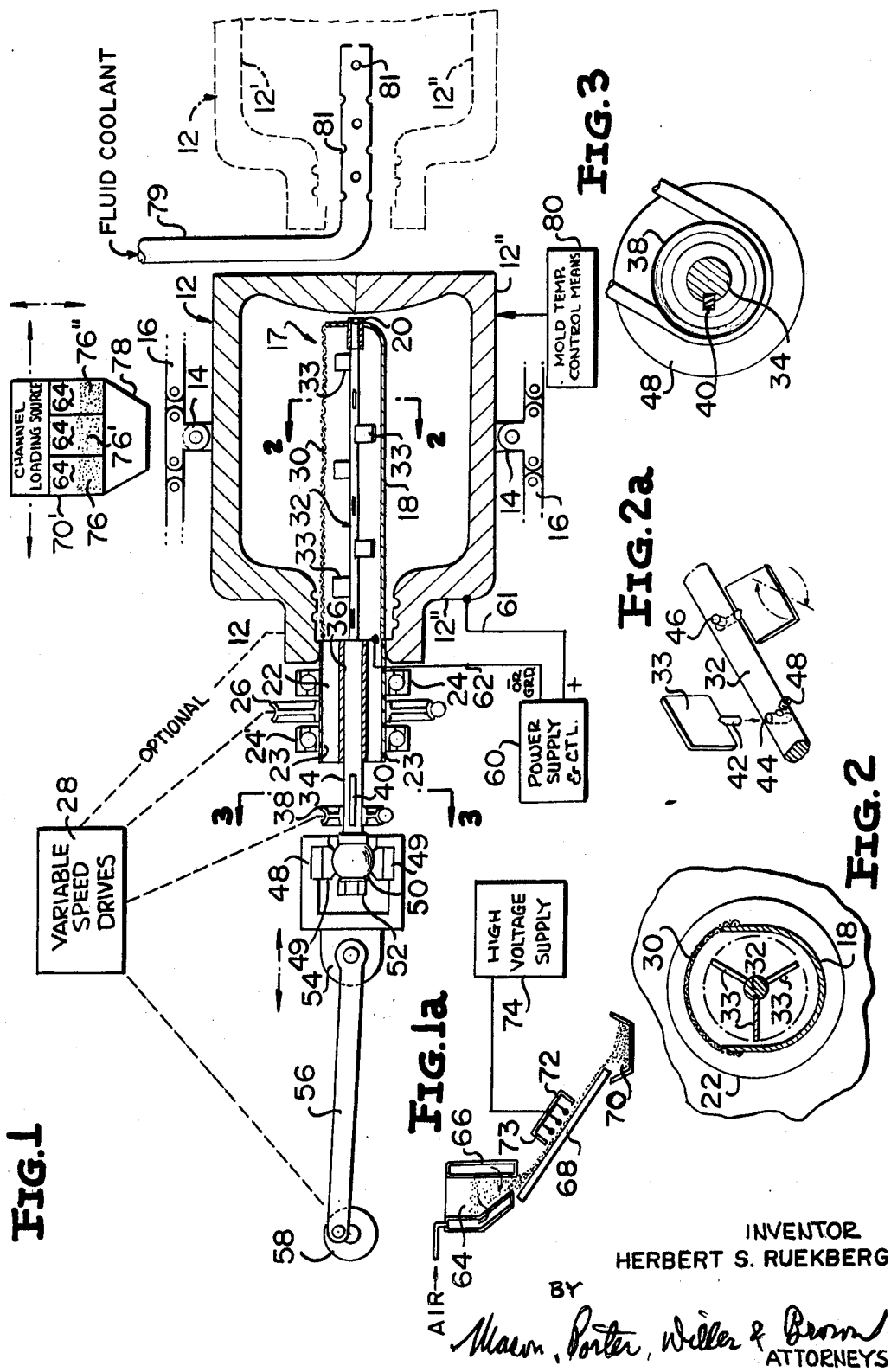

United States Patent Office 3,478,387
Patented Nov. 18, 1969

3,478,387
APPARATUS FOR ELECTROSTATIC MOLDING
Herbert S. Ruekberg, Highland Park, Ill., assignor to Continental Can Company, Inc., New York, N.Y., a corporation of New York
Filed Oct. 21, 1965, Ser. No. 499,893
Int. Cl. B29c 5/04
U.S. Cl. 18—5                                      9 Claims

ABSTRACT OF THE DISCLOSURE

An apparatus for molding articles from comminuted material capable of being electrostatically charged, the apparatus being comprised of a mold charged at a first potential, a dispensing means for dispensing electrostatically charged material within the mold which is electrically insulated from the mold and charged at a second potential. In operation, rotational motion is produced between the dispensing means and the mold to uniformly distribute electrostatically charged comminuted material on the mold walls.

---

This invention relates to a method and apparatus for molding and more specifically to means for producing articles and containers, such as bottles, jugs, cups, tubs, barrels, liners, and the like, by distributing an electrostatically charged comminuted material on the surface of a mold, heating the mold to fuse the article and, if required, cooling the mold to rigidify the article. In addition, reinforced articles and containers of comminuted material having fibers embedded therein are envisioned.

One of the problems encountered in the use of molds for producing plastic articles is the control of the wall thickness. In the case of blow molding from a heat plasticized parison, the wall thickness is determined by the thickness of the parison and the distance it must stretch before encountering the wall of the mold. In the case of sintering from a powdered plastic, heavy average walls must be built up to insure against pin holes, or excessively thin weak areas that the comminuted or powdered material does not reach. For example, such areas may be found about the junction of the mold wall with the mold bottom. According to the geometric configuration of the mold, it will be evident that other areas are present in which it is difficult to direct the comminuted or powdered material.

Although the present invention relates primarily to the field of plastic molding, a number of advantages are set forth which makes the invention equally applicable in the fields of metal-forming, glass-forming, etc.

Th manufacture of containers, liners, and similar hollow articles by a process involving the extrusion of a tube or parison of plastic material and, while still in the plastic condition, constricting the tube at one end and inflating it with a gas pressure, is well known in the art. This process is commonly referred to as blow molding and it is known that the process suffers from a number of limitations. One such limitation, involves the control of the uniformity of the wall thickness. In order that certain areas be continuous and free of excessively thin or weak areas, other areas are made thicker than is desirable. For example, in blow molding a container such as a jug, the plastic material does not easily reach the corners of the mold, the corners being identified as the contiguous areas about the side wall and the bottom, and the side wall and the top of the mold. Since the hot plastic must stretch further in order to reach these areas, it is necessary that the walls be built up to a greater thickness than desirable in order for the parison to fully expand in the mold and yield a product which is free of excessively thin areas throughout the container.

In accordance with the teaching of the present invention, a comminuted material is electrostatically charged and supported adjacent the mold during the mold process. By charging the mold, or electrodes juxtaposed the mold, with an electrostatic charge unlike the charge on the comminuted material, the comminuted material may be directed into all areas of the mold to thereby produce a container having a uniform wall thickness throughout.

Accordingly, it is the principal object of the invention to improve molding techniques.

It is a further object of the present invention to improve molding techniques wherein the molded articles are of thermosetting plastic, thermoplastic, glass, or metal, or any of the foregoing having fibers embedded therein.

It is a further object of the present invention to improve molding techniques wherein the molded articles are formed from a finely divided, comminuted material of plastic, glass, or metal which is induced to deposit on the surface of a mold, under the influence of electrical means.

It is a further object of the present invention to improve molding techniques wherein the finely divided, comminuted material is electrostatically charged to one polarity and a potential difference is established between the mold and the material support to induce the material to deposit on a surface of the mold.

It is a further object of the present invention to improve molding techniques by precisely controlling the wall thickness of the article produced.

It is a further object of the present invention to provide an apparatus whereby an article, such as a container, may be produced whose wall thickness is uniform throughout the container.

It is a further object of the present invention to provide an apparatus for producing multi-wall articles of finely divided comminuted material which is electrostatically deposited on the surface of a mold.

It is a further object of the present invention to provide an apparatus for producing multi-wall articles of finely divided comminuted material which is electrostatically deposited on the surface of a mold, the walls being of similar or dissimilar material and either fused together or separated by an air space.

It is a further object of the present invention to provide an apparatus for producing articles having reinforced surfaces, the reinforcing material being in the form of fibers which are oriented in predetermined patterns.

Although the invention is primarily directed to the art of forming plastic objects on the surface of a mold, the invention may be directed to similar molding processes wherein the composition of the article is of metal, glass, etc. The requirement is that the comminuted or powdered material employed as the material of which the article is fabricated, must be capable of maintaining an electrostatic charge for at least a short period of time. While the invention is applicable to the molding of articles other than articles of plastic, the description will be directed toward that end from which the manner of practicing the invention in other fields will become apparent of those skilled in such fields.

The invention may be practiced with male or female molds or variations and combinations of male and female molds. In one embodiment of the invention, electrostatically charged comminuted plastic material is supported within a channel. Within the channel is a rotatable bladed shaft for assisting in the dispersion of the plastic material from the channel. A screen may be positioned over the open area of the channel to aid in the dispersion and distribution of the plastic material. A mold, preferably of the split type, is then positioned around the channel containing the electrostatic comminuted plastic material. A potential of the same charge as the comminuted material is then applied to the channel and the bladed shaft.

An unlike potential is then applied to the mold. The bladed shaft and channel are then rotated in opposite directions so that the comminuted material is aerated and propelled into the atmosphere inside the mold in a finely dispersed fog so that it can be attracted to the walls of the mold by electrostatic forces. As an optional feature, the mold may be rotated. The mold may be maintained at an elevated temperature so that the comminuted material would tend to fuse to itself upon contact with the mold and become rigid upon cooling. In the case of thermoplastic material, heat must be removed from the plastic after fusing until the plastic is rigid enough to be removed from the mold without distortion. If the plastic retains sufficient charge after heating, the article may be ejected from the mold electrostatically by reversing the polarity of the mold after it is opened. Alternatively, the mold may be maintained at a temperature below the fusion temperature of the material and after the distribution process has been accomplished, the temperature of the mold may be raised, causing a fusion of the material.

During the distribution of the material about the surface of the mold, means may be employed to reciprocate the blade which aids in an even distribution of the comminuted material. Also, the pitch of the blades on the shaft may be varied according to the particular requirements.

As the distribution of the comminuted material proceeds, it is noted that the material builds up primarily on the side walls of the mold with lesser amounts at the top, bottom and any curves within the mold. The uniformity of the coating is accomplished since the already deposited coating acts as an insulator so that the material is then attracted to the areas of the mold which are not covered, or slightly covered, with electrostatically charged comminuted material. The foregoing assumes that the mold is of a conductive material.

After the distribution of the electrostatic material has been accomplished and the object fused and cooled, the mold is separated and retracted and the channel is recharged with electrostatic comminuted material.

In another embodiment of the invention, a plurality of corona wires are positioned about the channel with their ends directed into the areas of the mold in which difficulty is experienced in depositing the material.

The corona wires act to "drive" and direct the electrostatically charged material to the mold wall, which, of course, is aided by the electrostatic attraction of the electrostatically charged material to the mold of unlike charge.

In addition to the practice of the invention by using conductive molds, the employment of molds of poor conductors, such as glass, are envisioned. A number of materials are known which have a resistivity of less than $10^{12}$ ohms per centimeter which would be suitable material for molds and in which case backing electrodes would be employed. The backing electrode then provides the unlike charge for attracting the electrostatically charged comminuted material. Thus, electrodes may be placed about the mold in the areas where it is difficult to deposit material. Further, a plurality of electrodes may surround the mold in a number of geometric patterns so that multicolor and/or multi-material articles such as containers, may be produced. In addition, decorative inserts may be positioned about the inside of the mold so that the container is formed with its decorative material in place as soon as the comminuted material is fused.

In the molding art, it will be readily understood that the mold may be precoated with a powder or other material which aids in the removal of the finished object from the mold.

The foregoing invention may be practiced by employing closed cavities or molds for containers such as bottles or by using plugs (cores) or male molds for open containers such as cups or tubs. The apparatus and method is ideally suited for producing very large containers such as 55 gallon drums and liners therefor as well as very small articles, examples of which have been set forth. It will be intuitively clear that a uniform wall thickness may be maintained since the invention teaches and illustrates the manner in which discrete areas of the mold may be selected and comminuted material directed thereto. It is also envisioned that holes or apertures may be formed in the molded object by the positioning of an electrode in the desired area and the application of a potential which acts to repel the comminuted material.

In another embodiment of the invention which is described and illustrated, a male mold is surrounded by a chamber which communicates with a hopper or trough for supporting the comminuted material. The comminuted material may be electrostatically charged while it is in the hopper, before it enters the hopper, after it leaves the hopper, or combinations of the foregoing. Relative motion between the chamber and the male mold and the application of the electrical potential of proper polarity to the mold and chamber will cause the fine powder or material to be deposited upon the surface of the male mold upon the rotation of a dispenser within the trough. The mold may be heated to fuse the article so formed and cooled to rigidify the article as found necessary or the exterior of the article so formed may be subjected to a steam chamber or other type of heated environment.

Further ramifications include the forming of a container having an inner wall or section formed about a male mold and the forming of a similar type of article by a female mold. The outer shell formed by the female mold may then be joined to the inner shell formed by the male mold so as to provide a double wall article of similar or dissimilar materials. Further embodiments include the construction of a double wall article wherein an air space is provided between the inner and outer shell with the article being joined about the lip of the inner and outer shells or at any other appropriate points.

Electrostatic ejection means are also contemplated wherein the article after being solidified (heated and/or cooled as found necessary) may be electrostatically charged if sufficient charge does not remain upon the article and subjected to a device of unlike electrostatic charge so as to cause a removal of the article from the mold.

The formation of reinforced articles is also contemplated in the practice of the invention and the apparatus and method for accomplishing the same is set forth. Short fibers are employed to reinforce the articles. Fibrous fillers are often added to plastic materials to enhance their physical properties such as tensile strength and flexural modulus. To obtain optimum benefits from a fiberous filler, control should be maintained in the distribution of the fibers and the orientation of the fibers. The density of the fibers should be maintained evenly throughout the product and to obtain optimum physical characteristics, the fibers should be interwoven at approximately right angles to each other. After a layer of finely divided electrostatic powder is deposited on the surface of a mold, electrostatically charged fibers are evenly distributed over the layer of powder. It is the nature of the charged fibers to stand at right angles to the grounded mold (or at some other electrical potential) with one end of the fiber embedded in the tacky plastic material that was previously deposited. Thereafter, an electrode with the same electrical charge as the end of the fiber that is furthest removed from the mold is caused to traverse the mold, each fiber is repelled thus causing the fiber to lean away from the electrode and become embedded or partially embedded in the plastic comminuted material deposited. Control of the direction of the moving electrode will produce various patterns of the fibers which could be deposited upon subsequent operations. The application of the charged powder and the charged fibers may be alternated or a first layer of fibers may be applied to the plastic, oriented in a desired direction, followed by the application of a second quantity of fibers which would be oriented in a second direction. The invention is equally applicable to flat molds, male molds, or female molds or combinations of these.

The invention both as to its organization and method of operation together with further objects and advantages thereof will best be understood by reference to the following specification taken in conjunction with the accompanying figures in which:

FIGURE 1 is an elevational view, partly in section, illustrating one form of the apparatus for carrying out the molding technique in accordance with the principles of the invention;

FIGURE 1a is an elevational view illustrating the electrostatic charging of the comminuted or powdered material employed as the composition of which the articles produced are composed;

FIGURE 2 is a cross sectional view taken along the line 2—2 of the FIGURE 1 and illustrating the channel for receiving the comminuted material and the bladed shaft employed to assist in the removal of the comminuted material from the channel;

FIGURE 2a is a persepctive view of a portion of the bladed shaft and showing the means for adjusting the pitch of the blades;

FIGURE 3 is a cross sectional view taken along the line 3—3 of the FIGURE 1 and depicting a pulley arrangement for rotating the bladed shaft;

FIGURE 4 is another embodiment, similar to the FIGURE 1, but showing the corona wires whose ends are directed to the area of the mold in which it is difficult to cause a deposition of the comminuted material;

FIGURE 5 is a cross sectional view taken along the line 5—5 of the FIGURE 4 and showing the supporting guides along the channel for the corona wires;

FIGURE 6 is a cross sectional view of a mold having high resistivity and wherein a plurality of electrodes are positioned about the mold for directing comminuted material to the selected areas of the mold according to the potential applied to the respective electrode by the variable power supply;

FIGURE 7 is similar to the FIGURE 6 except that the electrode surrounding mold is rectangular;

FIGURE 8 illustrates a type of mold wherein the walls, bottom, and junction of the walls and bottom may be maintained at selected potentials according to the difficulty of depositing comminuted material on those areas of the mold;

FIGURE 9 is a cross sectional view of a mold and illustrating the position of a decorative insert prior to the molding and fusing operation;

FIGURE 10 is an elevational view, partly in section, of the manner in which a male mold would be employed in the practice of the invention;

FIGURE 11 is a sectional view taken along the line 11—11 of the FIGURE 10.

The FIGURE 1 shows the invention as practiced with the formation of a bottle or jug, the mold having that configuration. It will be readily understood that by using plugs, cores or male molds, open containers such as cups, tubs or the like may be produced. This will be illustrated in later figures.

In the FIGURE 1, a split mold 12 has an upper section 12′ and a lower section 12″. Secured to each of the sections 12′ and 12″ of the split mold 12 is a projection 14 which may be coupled to an advancing means 16 shown in phantom outline. By this arrangement, the split mold 12 may be opened or closed and it is envisioned that a plurality of molds may be secured to the advancing means 16 so that the invention may be practiced on an automatic assembly line basis. The advancing means 16 may operate to convey the molds to the charging position as shown in the FIGURE 1 or may retract the mold to a position shown in dotted outline at the right side of the drawings. The manipulation of the mold will be in accordance with the shape of the article being produced since it will be readily understood that the separation of a mold used for forming jugs and the like would necessarily be different from the manipulation of a mold for forming cups or open end containers.

As shown in the FIGURE 1, a dispenser 17 or means for distributing the comminuted material within the mold comprises a channel of U-shape configuration (a cross section of which is shown in the FIGURE 2) and is identified as 18. The channel 18 protrudes within the mold 12 during the molding operation and may be closed at its right end and at this end, supports a bearing 20. At its left end, the channel 18 is secured to a shaft 22, which shaft 22 is surrounded by an insulating sleeve 23 which is in turn surrounded by a pair of bearings 24 and 24′. Alternatively, the shaft 22 could be of an insulating material. The inner races of the bearings 24 and 24′ engage the insulating sleeve 23 while the outer races of the bearings 24 may engage any suitable supporting means (not shown) for providing the necessary support. A pulley 26 is secured to the sleeve 23 about the shaft 22 and through its coupling to a variable speed drive 28, rotational motion may be supplied to the channel 18.

As best shown in the FIGURE 2, the open portion of the U-shaped channel 18 may be surrounded by a screen 30 although the use of the screen 30 is optional. The distribution of the comminuted material may be made more uniform through the use of the screen 30 since it will act to further disperse the powdered plastic or comminuted material into a fine mist and as hereinafter set forth and assist in driving the particles towards the walls of the mold due to its electrostatic charge. The screen 30 may be removed in any suitable manner during the loading of the comminuted material into the channel 18.

A bladed shaft 32 having the blades 33 at spaced intervals projecting therefrom, is positioned within the channel 18 and supported at its right end by the bearing 20 which is affixed to the end of the channel 18. At its left end, the bladed shaft 32 is connected to or enlarges to become a shaft 34 which passes through an aperture in the shaft 22. A longitudinal extending sleeve bearing 36 of circular construction surrounds the shaft 34 and fits within the aperture of the shaft 22. By this arrangement, independent motion of the shafts 22 and 24 may be accomplished.

Rotational motion is supplied to the shaft 34 by a pulley 38 which is secured thereto by a key 40. The pulley 38 is driven by the variable speed drive 28. Under usual conditions, the pulley 38 would be driven in a direction opposite to the pulley 26 so that the contra-rotating bladed shaft 32 and channel 18 would provide maximum dispersion of the comminuted material from the channel.

The blades 33 on the bladed shaft 32 are adjustable and their pitch may be changed in a manner shown in the FIGURE 2*a*. Each of the blades 33 has a projecting shaft 42 which is received into an aperture 44. A set screw 46 then locks the blade 33 into the desired position.

As shown in the FIGURE 3, the shaft 34 is keyed to the pulley 38 by the key 40. It is understood that a mating keyway is provided in the shaft 34 and the pulley 38 to receive the key 40. As shown in the FIGURE 3 and perhaps best in the FIGURE 1, a cylindrical jaw 48 receives a bearing 49 which engages a ball joint 50 which is connected to the end of the shaft 34 and secured thereto by a nut 52. The cylindrical jaw 48 has a projection 54 to which is pinned a link 56 which provides reciprocating motion by its connection to a crank 58. The crank 58 is given rotational movement through its coupling to the variable speed drive 28. By the foregoing ball joint 50 and cylindrical jaw 48 arrangement, the blade shaft 32 is given reciprocating motion while at the same time permitting the rotary motion supplied by the pulley 38. In this manner, a uniform distribution of the comminuted material placed in the channel 18 is accomplished.

In order that the principles and features of the invention be carried out, a potential difference is established between the channel 18 and the mold 12. This voltage is supplied by a power supply and control circuit 60 which has its positive output connected to the mold via a conductor 61 and its negative output connected to the channel 18 via a conductor 62. Since the connection of the conductors 61 and 62 to the mold 12 and the channel 18, respectively, would be to rotating members, the electrical connection is through the use of conventional slip ring (shown diagrammatically as a large dot) or the like. Further, it will be understood that the polarity of the power supply may be reversed since the polarity is dependent upon the eletctrostatic charge of the comminuted material and it will be readily understood that comminuted material, to be hereinafter described, may be charged either positively or negatively, according to the material.

Since the channel 18 is not electrically insulated from the screen 30 or the bladed shaft 32, then these elements will be at the same potential as the channel 18.

Assuming that the channel 18 is to be charged negatively, then the comminuted material to be supplied for the molding process must likewise be charged negatively. Suitable comminuted material may include thermosetting plastics that fuse and set while heated or thermoplastic material such as polyethylene, polystyrene, polypropylene, polyurethane, etc. in which case the mold must be heated to fuse the material and then cooled to rigidify the casting Another suitable material is the commercially available non-conductive toner material manufactured by the Xerox Corporation. These toner particles are composed essentially of pigmented or dyed particles of a mixture of n-butyl methacrylate (41%) and polystyrene (59%), with an average particle size of approximately 17 microns.

After the comminuted material is selected, and before application to the channel 18, it is appropriately charged (for example, negatively) as shown in the FIGURE 1a. The particles or comminuted material 64 are loaded into an aerated bin 66 and caused to pass over an inclined table 68 and by gravity into a collector 70. During the passage of the material 64 across the table 68, they pass under a plurality of corona needles 72 which are supported within a housing 73 and connected to a high voltage supply 74, as shown. During the passage of the material 64 under the corona needles 72, the material 64 will become electrostatically charged, and in the particular example selected, the electrostatic charge will be negative. The electrostatically charged comminuted material 74 may be loaded directly from the table 68 into the channel 18, or it may be loaded into the channel 18 from the collector 70. A collector 70' is shown above the mold 12 and is similar to the collector 70 except that partitions are supplied so that three areas are available for supplying different types and/or colors of comminuted material to the channel 18. The means 70' is identified as a channel loading source and may reciprocate by any suitable means for distributing the comminuted material in the channel 18. As noted, the channel loading source 70' has a first compartment 76, a second compartment 76' and a third compartment 76" all communicating with a common hopper 78 which is directed to insert the electrostatically charged material 64 into the channel 18. It will be readily understood to those skilled in the art, that the corona charging of the particles is well known and may be accomplished in the manner set forth or a simple arrangement following the teaching of the FIGURE 1a may be employed to charge the particles as they enter the channel 18. Further, it will be understood that the polarity of the power supply 60 may be reversed so that a positive potential is now applied to the channel 18. In this case, the comminuted material 64 would be electrostatically charged in a positive direction by the high voltage supply 74 of the FIGURE 1a.

The temperature of the mold 12 must be controlled in order that the comminuted material be fused to form the molded article. Accordingly, a mold temperature control means 80 is shown in block form and would be of any conventional construction so as to provide the desired temperatures. The mold temperature control means 80 may maintain the mold 12 at an elevated temperature so that the powder is then introduced into a hot mold and fuses to itself as it touches the surface of the mold 12. Alternatively, the comminuted material 64 may be distributed about the walls of the mold 12 and then the mold would be heated and the material 64 will fuse as in conventional sinter molding. The mold would be cooled causing the material to solidify and then be removed from the open mold by conventional means.

An apparatus adapted to quickly cool the interior of an article is shown cooperating with the mold 12, in phantom outline in the FIGURE 1. A pipe or conduit 79 is inserted into the mold and article and a fluid coolant such as cooled water vapor, air, etc., is supplied to the conduit 79 which emits the coolant via a plurality of apertures 81. The conduit 79 may be inserted and withdrawn as found convenient or necessary.

The embodiment shown in the FIGURE 4 is similar to that illustrated in FIGURE 1 except that a plurality of corona wires have been added to assist in directing the charged comminuted particles to desired areas and, in addition, a plurality of longitudinally spaced electrodes are shown. As best shown in the FIGURE 5 which is a cross sectional view taken along the lines 5—5 of the FIGURE 4, the modified channel 18' has been fitted with a plurality of projections into which are formed longitudinal openings 82. Into each of the longitudinal openings 82 is positioned a plurality of corona charging wires 84. With reference again to the FIGURE 4, the corona wires 84 extend through openings in the shaft 22' and have their ends rigidly connected to an insulator block 86. The pair of bearings 24 are insulated from the shaft 22' by an insulating sleeve 88. The shaft 34 runs in the circular bearing 36 and is insulated from the insulator block 86 by an insulating sleeve 90. The insulator block 86 slides on the shaft 34 so that the corona charging wires 84 can be retracted during the positioning and removal of the mold 12.

Illustrative of the positioning of external electrodes, a plurality of longitudinally spaced electrodes 81, 83 and 85 surround the mold 12 and an end electrode 87 may have potentials of unlike charge to the comminuted material applied thereto for assisting in depositing the material in the desired areas.

The power supply is not shown in the FIGURE 4; however, it is similar to the supply of the FIGURE 1 except that different voltages of the same polarity would be applied to the electrodes 81, 83, 85 and 87 while the channel 18', bladed shaft 32, blades 33, screen 30, corona wires 84, and the comminuted material (not shown in the FIGURE 4) are at opposite polarity. Since the channel 18', screen 30, bladed shaft 32, blades 33, and corona wires 84 are not insulated from each other, the application of an electrical potential to any of these elements would place all of the elements at substantially the same potential. This potential would be applied in any manner well known in the art such as by a brush arrangement or the like.

The FIGURES 6 and 7, as well as the FIGURE 4, illustrate the positioning of electrodes about molds which are poor conductors. Such molds may be of certain types of glass. Electrodes are positioned about the molds and different potentials may be applied to the electrodes according to the difficulty of depositing electrostatically comminuted material in the area associated with the electrodes. For example, in the FIGURE 6 a circular mold 92 is surrounded by a plurality of sectionalized electrodes 94 through 101. Each of the electrodes 94 through 101 is connected via a conductor, as shown, to a variable power supply 102 having a plurality of taps, a tap per electrode. Each of the taps of the power supply 102 is capable of supplying a different potential or voltage to its associated electrode. In the areas of the mold where it is least difficult to deposit the electrostatically charged material, the power supply through its associated tap would supply a lower voltage to the electrode in that area than to the electrodes positioned in the areas of the mold where it is difficult to deposit the material. This feature will be better illustrated with subsequent reference to the FIGURE 7.

With continued reference to the FIGURE 6, certain of the electrodes may have applied thereto through the variable power supply 102 zero voltage or even a voltage or potential of like charge as the electrostatically charged comminuted material so that little or no material would be deposited in that area associated with that particular electrode. This would be most helpful in the event that it is desired to form openings or apertures in the article to be molded. In addition multi-colored containers may be formed by applying a potential only to certain selected ones of the electrodes during the distribution of a particular color of electrostatically charged material and at subsequent distribution times, applying potentials to others of the electrodes so as to attract the second color or electrostatically charged material. For example, in the FIGURE 6, if a two color container is desired, then the electrodes 94, 96, 98 and 100 could be charged to a potential to attract the first color of electrostatic material while the remaining electrodes 95, 97, 99 and 101 are held at a potential similar to the electrostatically charged material. Subsequently, with the introduction of the charged material of the second color, the potentials on the electrodes would be reversed so that the electrodes 95, 97, 99 and 101 would attract the electrostatically charged material while the electrodes 94, 96, 98 and 100 would repel the second color of electrostatically charged material. Thus, a two colored container having alternate areas of the two colors has been formed.

In the FIGURE 7, a substantially square mold 92' is illustrated. The mold 92' is surrounded by the electrodes 94' through 101' with the even numbered electrodes being positioned at the four corners of the mold 92'. The odd numbered electrodes are substantially flat since they are positioned in the straight portions of the mold 92'. In a mold of the type illustrated in the FIGURE 7, there is a greater tendency for the electrostatically charged comminuted material to deposit in the mold 92' in the areas adjacent the electrodes 95', 97', 99', and 101' rather than in the corner electrodes 94', 96', 98', and 100'. To overcome this deficiency and to produce an article or product of uniform thickness, a greater voltage would be applied to the corner electrodes 94', 96', 98' and 100' so as to increase the attraction of the electrostatically charged material to these areas of the mold rather than in the flat areas where it is somewhat less difficult to achieve a deposition of the material.

The FIGURE 8 illustrates a mold having low resistance which is sectionalized so that the wall, corners, and bottom or end may have different voltages applied thereto. The wall of the mold forms an electrode 104; the corner forms an electrode 106; and the end forms an electrode 108. The various sections are insulated from each other, as shown. In the order of affinity of the electrostatic material to deposit upon the inside of the mold, the greatest affinity is in the area about the electrode 104, the next is in the area about the end electrode 108, with the least affinity being in the corner areas about the corner electrode 106. Accordingly, in order of greatest voltage to least voltage, the larger potential of unlike charge would be applied to the corner electrode 106, a smaller potential to the end electrode 104. In this manner, a substantially uniform container may be formed since the problem of overcoming the deposition of electrostatic material in the difficult areas of the mold has been overcome by increasing the attraction of the material in the areas of the mold most difficult to deposit the material.

The FIGURE 9 illustrates a mold 110 which has inserted therein a decorative insert 112 which would be positioned within the mold before the deposition process has commenced. By utilization of the decorative insert 112, a pre-decorated container may be formed, thus eliminating the step of decorating the container after its formation, such decorative insert 112 may bear trade names, trade-marks, instructions, etc.

The operation of the apparatus will now be set forth. The comminuted material is electrostatically charged by passing it over the table 68 and under the corona needles 72 of the FIGURE 1a. For the purposes of this example, a high negative voltage is applied to the corona needles 72 from the voltage supply 74 so that the particles take on a negative charge. Alternatively, the material may be charged in the channel 18 by corona pins, shown in subsequent figures. With the mold 12 in its retracted position in dotted outline in the FIGURE 1, the electrostatically charged comminuted material 64 is distributed within the channel 18 by the channel loading source 70'. The channel loading source 70' is then withdrawn and the advancing means 16 then positions the split mold 12 comprising the mold sections 12' and 12'' in the position shown in solid outline in the FIGURE 1. The power supply and control circuit then applies a positive charge to the mold 12 via the conductor 61 and via the conductor 62, a negative charge to the channel 18, bladed shaft 32, the screen 30 and the charged comminuted material contained in the channel 18.

If it is desired that the material be applied to a hot mold, then the mold temperature control means 80 would maintain the mold 12 at the desired temperature. If it is desired that the comminuted electrostatically charged material be distributed prior to heating, then the mold temperature control means 80 would maintain the mold below the sintering temperature of the material until such time as the distribution of the material has been completed.

The variable speed drive 28 is now actuated so that through the pulley 26 the channel 18 is rotated in one direction while the pulley 38 rotates the bladed shaft 32 with its projecting blades 33 in the opposite direction. In addition, the reciprocating means is started by rotation of the crank 58 which reciprocates the bladed shaft 32 within the channel 18. The material is propelled in a finely dispensed fog into the atmosphere of the mold.

The electrostatically charged material is now attracted to the mold 12 wall since it is of an unlike charge. As the deposition of the material proceeds, the material builds up in the areas perpendicular to the bladed shaft and this build up of material, tends to insulate the electrostatic attraction of the mold under the area of the build up so that the charged material then is more attracted to the ends and corners of the mold. After all of the charged material has been evacuated from the channel 18, a substantially uniform deposit of material has been achieved throughout the mold. The mold temperature control means 80 is then manipulated so as to fuse and rigidify the material if not already heated or cooled, the power supply 60 is extinguished, the variable speed drive 28 is halted and the advancing means 16 removes the mold from the molded container or article.

In the alternate arrangement set forth in the FIGURES 4-9, the voltages, corona wires 84 of the FIGURE 4, or the decorative insert shown in the FIGURE 9, would be adjusted and manipulated as previously set forth.

Multi-colored containers as well as containers of different material may be produced in the minutely electrical conducting mold shown in the FIGURES 6 and 7. If a greater agitation of the material is desired, then the pitch of the blades 33 coupled to the bladed shaft 32 would be adjusted as shown in the FIGURE 2a.

With reference to the FIGURES 10 and 11, an arrangement is set forth wherein a male mold may be utilized in the practice of the invention. A male mold 114 includes a core 116 upon which the powdered material is deposited for molding and a circular base section 118. An insulating sleeve 120 surrounds the base section 118 and serves to insulate the male mold 114 from a mold retraction means 122 as well as a housing 124 surrounding the core 116 of the male mold 114. The geometry of the housing 124 is such that a chamber 126 is formed between the outer surfaces of the core 116 and the inner surfaces of the housing 124.

Positioned above the housing 124 is a hopper or trough 128 which communicates with the chamber 126 via a slot 130 formed in a section of the housing 124. A cover 129 encloses the hopper 128 and is hinged at 131. An electrical potential is applied to the mold 114 via the conductor 61 from the power supply and control 60 and to the hopper 128 by the conductor 62.

In one embodiment electrostatically charged comminuted material is supplied to the hopper 128 from the aerated bin 66 which communicates with the hopper 128 via the inclined table 68. As the comminuted material passes from the aerated bin 66 across the table 68, it is subjected to a high voltage of a selected polarity applied to the corona needles 72 which are coupled to the high voltage supply 74. In other embodiments, the comminuted or powdered material to be attracted to the molds may be charged while it is in the hopper or after it leaves the hopper or combinations of before it enters the hopper, while it is in the hopper, or after it leaves the hopper. Experience and experimentation will dictate the most efficient manner for electrostatically charging the material selected for deposition upon the molds.

As shown in the FIGURE 11, a powder cloud dispenser 132 is positioned within the hopper 128 and includes a shaft 134 having a plurality of projecting blades 136 coupled thereto. Rotation of the shaft 134 will cause the blades 136 to engage the powder or comminuted material and through the electrical forces established, the comminuted material will be dispersed from the hopper 128 into the slot 130 communicating with the chamber 126 to be deposited upon the core 116 of the male mold 114. Suitable means would be employed to rotate the shaft 134 at the optimum r.p.m. Since the core 116 of the male mold 114 is of a charge opposite to that induced upon the comminuted material in the hopper 128, the comminuted material would be attracted to the core 116. As the material builds up upon the rotating male mold 116, the rotation of the mold being hereinafter described, the areas of the core 116 receiving more electrostatically charged material than other areas will tend to insulate the more heavily coated areas so that the remaining charged material will be induced to deposit upon the thinner sections of the mold. In this manner, a uniform and even distribution of the charged material about the core 116 is accomplished. Further, a predetermined quantity of material may be loaded into the hopper 128 so that the final weight and size of the article formed about the core 116 can be accurately predicted.

The male mold 114 includes the structure for providing a number of features such as retraction of the mold, rotation of the mold, heating and/or cooling of the mold, and means for ejecting the molded article from the mold. More specifically, the mold may be retracted from the housing 124 by any suitable means such as the mold retraction means 122 previously set forth. It will be intuitively clear to those skilled in the art that other arrangements will be found suitable for moving the mold 114 and the housing 124 with respect to each other. Rotation of the mold is accomplished by a shaft 138 which is affixed to the base 118 by a flange 140 having a plurality of studs 142 securing the flange 140 to the base 118. A pulley 144 is positioned on the shaft 138 which may be driven by a belt 146.

The tapered projection or core 116 of the male mold 114 may be heated by electrical means or may be heated and/or cooled by the provision of a labyrinth of tubes embedded in the core 116 to which the temperature of the mold 114 will conform according to the temperature of fluid introduced to the tubes or passageways embedded therein. For example, a tube or passageway 148 in the base 118 communicates with a coiled tube 150 in the core 116 and exits via a tube 152 in the base 118. Thus, heated fluid induced to flow in the tubes 148, 150 and 152 will heat the mold whereas cooled fluid in the foregoing tubes will cool the mold.

Ejection of the article or product after it has been rigidified on the mold 114 may be accomplished by ejector pins, a stripper ring, or by air pressure and as an example of an ejection means, a face plate 154 forms one end of the core 116 of the male mold 114. The face plate 154 is affixed to an axially movable shaft 156 which is biased in the position shown by a spring 158. Actuation of the shaft 156 rightwardly as viewed in the FIGURE 10 will cause the face plate 154 to separate from the core 16 and carry the article along with it so as to accomplish the ejection from the mold. Rather than a mechanical movement of the shaft 156 to dislodge the molded article, air pressure may be applied to a spacer 160 which will produce relative movement between the core 116 and the face plate 154.

As the mold 114 is rotated through the cooperation of the pulley 144 and the belt 146, suitable means and method would be employed to provide the cooling fluid to the tubes 148, 150 and 152 as well as electrical energy via the conductor 61 to the mold 114. In order that the invention not be obscured, these details have been minimized or eliminated.

Thus, it will be evident that the foregoing invention may be practiced in many forms and embodiments. The apparatus and method described is capable of producing containers and articles having walls of substantially uniform thickness. The articles thus produced are free of pin holes in all areas and a savings of materials may be effected in that heavy walls do not need to be built up in the areas where it is least difficult to deposit the electrostatically charged material. The process can be practiced employing closed cavities for containers such as bottles and jugs or by using male molds for producing such articles as cups, tubs, liners, barrels, etc. Holes or openings can be produced in the product by leaving certain sections of the mold uncharged or reversely charged. By charging separate sections of the mold in sequence and introducing different colored material or different material in sequence, multi-color or multi-material articles can be produced.

Thus, the present invention may be embodied in other specific forms without departing from the spirit and the essential characteristics of the invention. The present embodiments are, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. Apparatus for molding an article comprising a mold, means electrically insulated from said mold for dispensing comminuted material, means for producing rotational motion between said mold and said means for dispensing comminuted material, and means for establishing a first potential on the means for dispensing comminuted material, and a second potential on the mold for aiding the distribution of the comminuted material about the mold.

2. The apparatus of claim 1 including means for agitating the comminuted material.

3. The apparatus of claim 1 including means for controlling the temperature of the mold for fusing and rigidifying the distributed material.

4. The apparatus of claim 1 including means insertable within said mold for cooling the fused comminuted material.

5. The apparatus of claim 1 wherein the mold is a split mold.

6. The apparatus of claim 1 wherein the mold has minute electrical conductivity and includes an electrode surrounding the mold.

7. The apparatus of claim 1 including a plurality of circumferential electrodes electrically insulated from one another and surrounding the mold.

8. Apparatus for molding articles comprising a housing having an open end, a mold extending into the open end of the housing and forming a chamber between the mold and the inner wall of the housing; means supported by the housing and communicating with the chamber for distributing comminuted material, means for establishing a first potential on the housing and the material and a second potential on the mold and rotatable means positioned within said means for distributing comminuted material for dispensing material to said chamber for deposition upon said mold.

9. Apparatus for molding an article comprising a mold, means electrically insulated from said mold for dispensing comminuted material, a plurality of corona wires surrounding the means for dispensing comminuted material, the ends of said wires being directed to areas inside the mold, means for producing rotational motion between said mold and said means for dispensing comminuted material, and means for establishing a first potential on the means for dispensing comminuted material and the corona wires, and a second potential on the mold for aiding the distribution of the comminuted material about the mold.

References Cited

UNITED STATES PATENTS

| | | | |
|---|---|---|---|
| 2,451,934 | 10/1948 | Evans | 264—24 |
| 2,920,679 | 1/1960 | Sittel | 264—24 |
| 3,187,381 | 6/1965 | Britten | 18—5 |
| 3,278,656 | 10/1966 | Dicks et al. | 264—24 |
| 3,173,175 | 3/1965 | Lemelson. | |
| 3,226,227 | 12/1965 | Wolff | 117—17.5 X |
| 3,231,374 | 1/1966 | Sciambi | 117—17.5 X |
| 3,366,993 | 2/1968 | Lemelson. | |
| 3,368,014 | 2/1968 | Tijunelis | 264—132 |
| 3,369,274 | 2/1968 | Dicks et al. | |

OTHER REFERENCES

Paint, Oil and Chemical Review, May 4, 1944, pp. 7 and 18.

WILBUR L. McBAY, Primary Examiner

U.S. Cl. X.R.

18—26, 30; 264—24, 312